United States Patent [19]

Wiener

[11] 4,078,303
[45] Mar. 14, 1978

[54] APPLIANCE FOR HANDLING SUBSTANTIALLY CYLINDRICAL ARTICLES

[75] Inventor: Hans Wiener, Taby, Sweden

[73] Assignee: Pressmaster A.B., Stockholm, Sweden

[21] Appl. No.: 647,641

[22] Filed: Jan. 8, 1976

[30] Foreign Application Priority Data

| Apr. 11, 1975 | Sweden | 7504158 |
| Apr. 17, 1975 | Sweden | 7504430 |
| Apr. 21, 1975 | Sweden | 7504555 |
| May 14, 1975 | Sweden | 7505501 |

[51] Int. Cl.² ............................................. H02G 1/12
[52] U.S. Cl. ................................................ 30/90.1
[58] Field of Search ............... 81/9.51, 9.5 R, 9.5 C; 30/90.1

[56] References Cited

U.S. PATENT DOCUMENTS

| 2,446,558 | 8/1948 | Schwarz | 81/9.51 |
| 2,929,285 | 3/1960 | Gulemi | 81/9.51 |
| 2,932,224 | 4/1960 | Peed, Jr. | 81/9.5 B |
| 3,169,315 | 2/1965 | Mankovitz | 30/90.6 |
| 3,796,115 | 3/1974 | Dane | 81/9.5 B |

FOREIGN PATENT DOCUMENTS

| 2,415,692 | 10/1975 | Germany | 81/9.5 R |

Primary Examiner—Al Lawrence Smith
Assistant Examiner—Roscoe V. Parker
Attorney, Agent, or Firm—Karl F. Ross

[57] ABSTRACT

A tong- or vice-like appliance for gripping, holding, pressing or incising pipes, cables and the like, particularly for stripping the ends of cables and crimping ferrules thereto, has a pair of jaws with one or more pairs of oppositely inclined engagement faces (in the form of cutting edges where appropriate). In one form, the appliance is specially designed for preparing the ends of coaxial cables, and in another form it is adapted to be threaded over the cable and rotated therearound for the purpose of converting an initial intermittent cut through insulation into a continuous cut for stripping the cable end. Signalling means may be provided for indicating the desired depth of penetration of the cutting faces into the cable.

14 Claims, 21 Drawing Figures

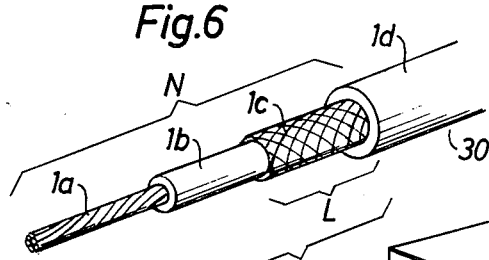
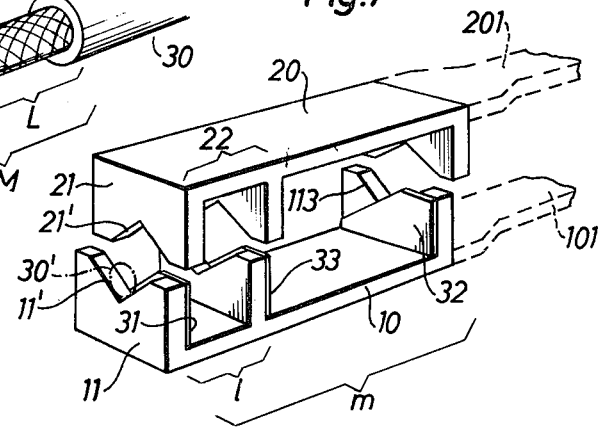
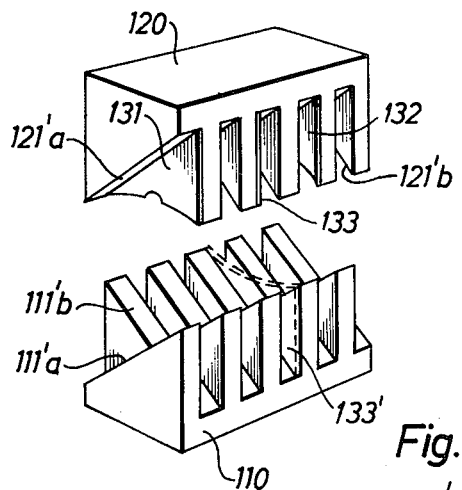
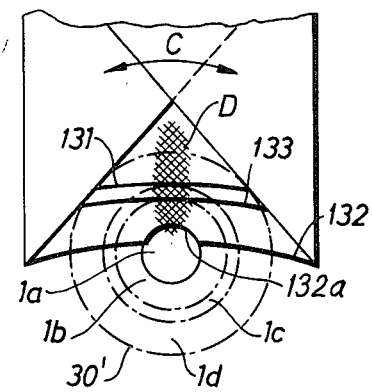
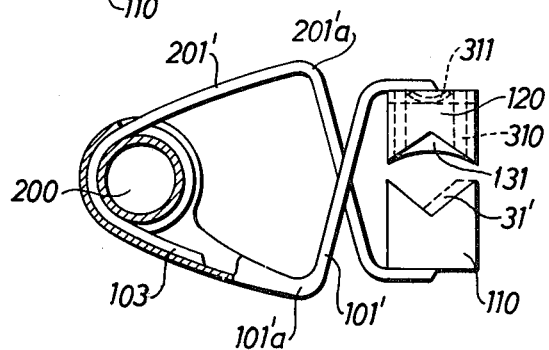

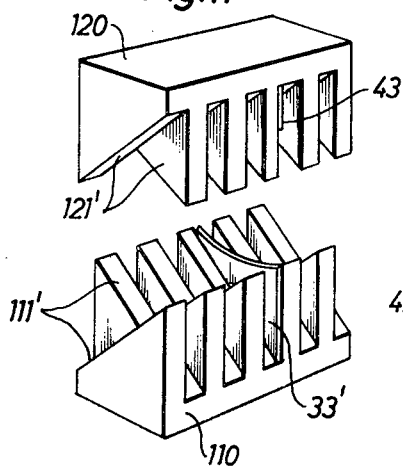
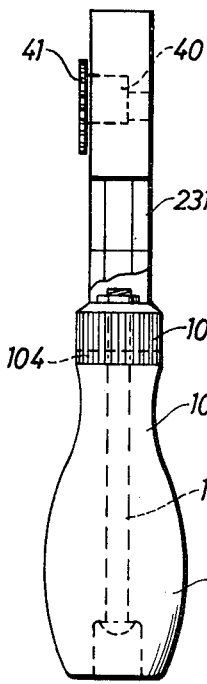
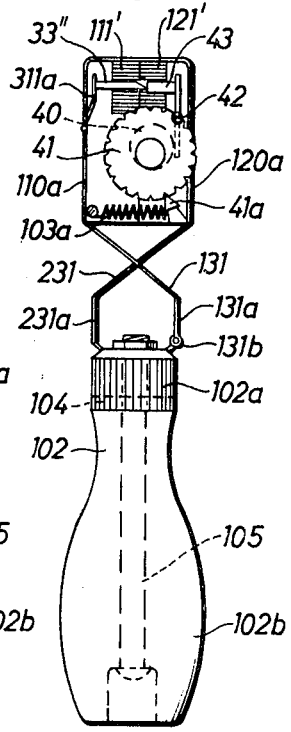
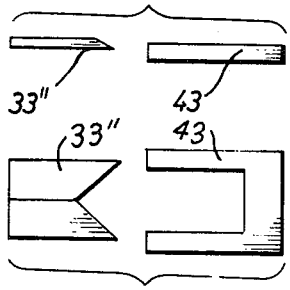
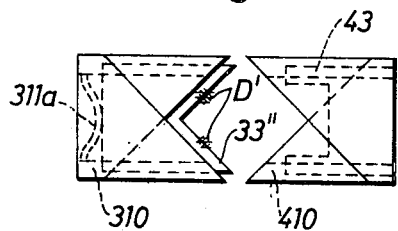
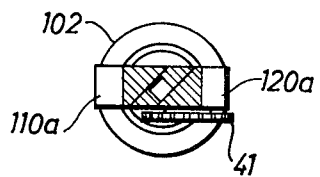

APPLIANCE FOR HANDLING SUBSTANTIALLY CYLINDRICAL ARTICLES

FIELD OF THE INVENTION

My present invention relates to a tool for baring an extremity of an insulated cable by stripping part of its insulation from it.

BACKGROUND OF THE INVENTION

Insulation-stripping tools are known, e.g. from U.S. Pat. No. 2,446,558, in which the cable extremity is clamped between two relatively movable jaws while a cutter head separate and remote from these jaws is rotated about the cable axis to form a circular incision in its insulation. That type of device, because of its relatively complex construction, is not suitable for incorporation into a portable appliance such as a hand tool.

OBJECTS OF THE INVENTION

The general object of my present invention, therefore, is to provide a simplified construction for an insulation-stripping tool which can operate with great precision on both simple and coaxial cables.

Another object is to provide means in such a tool for indicating, e.g. by means of an alarm signal, the instant when a cable insulation has been fully penetrated in order that further cutting into the underlying conductor may be prevented.

SUMMARY OF THE INVENTION

In accordance with my present invention, I provide each of the two relatively movable jaws with an elongate base having a multiplicity of parallel webs transversely rising therefrom, these webs being provided with preferably flat engagement faces that are inclined at an acute angle (generally of 45°) to a longitudinal plane of symmetry bisecting the base. The jaws are displaceable between a withdrawn position and a working position by being linked to operating means such as a pair of limbs rigid with their bases; such a displacement may be either parallel, as in a vise, or arcuate, as in a pair of pliers. In the latter instance the jaws may swing in a common plane of symmetry of their bases or in a plane perpendicular thereto. The engagement faces coact with one or more blades positioned on at least one of the jaws between adjacent webs thereof and projecting therebeyond to form a corresponding number of cutting edges which lie in planes parallel to the webs and bite into the insulation of a cable gripped by these faces.

According to another feature of my invention, a test circuit including a voltage source, an indicator such as a lamp and one or two cutting blades is closed when the blade or blades penetrate the insulation and make contact with a conductive core enveloped by that insulation. By this means it is possible to halt the cutting operation at the proper moment whereby cables of various diameters can be stripped in rapid succession.

According to a particularly advantageous feature of my invention, the webs of each jaw are alternately inclined in opposite directions with reference to the aforementioned plane of symmetry, each web of one jaw being aligned with a respective web of the other jaw whereby the webs interpenetrate in their working position. With the inclined faces of the aligned jaws lying parallel to each other at least in that working position, the inserted cable is engaged at diametrically opposite points by each pair of web faces, with a 90° offset between successive pairs of engagement points. This mode of engagement avoids any undulating deformation of the type frequently encountered when a cable is clamped between opposite jaw faces which are axially offset from each other.

BRIEF DESCRIPTION OF THE DRAWING

The above and other features of my invention will now be described in detail with reference to the accompanying drawing in which:

FIG. 6 is a perspective view showing a coaxial cable with an end from which the insulation has been stripped;

FIGS. 7 and 8 are views similar to FIGS. 2 and 4, showing the jaws thereof provided with cutting means pursuant to my invention;

FIG. 9 is a fragmentary end view, drawn to an enlarged scale, of a jaw similar to one of those shown in FIG. 8 but provided with multiple cutting means;

FIG. 10 shows an insulation-stripping hand tool embodying the invention;

FIG. 11 shows, in a view similar to FIG. 8, the jaws of a further insulation-stripping tool embodying the invention;

FIGS. 12a and 12b are an edge view and a face view of a cutting blade and a coacting stop for a tool according to my invention;

FIG. 13 shows a pair of jaws according to FIG. 11 equipped with the assembly of FIGS. 12a and 12b;

FIGS. 14 to 16 are two mutually orthogonal side views and an end view of an insulation-stripping tool representing another embodiment of my invention;

SPECIFIC DESCRIPTION

Figure 1:
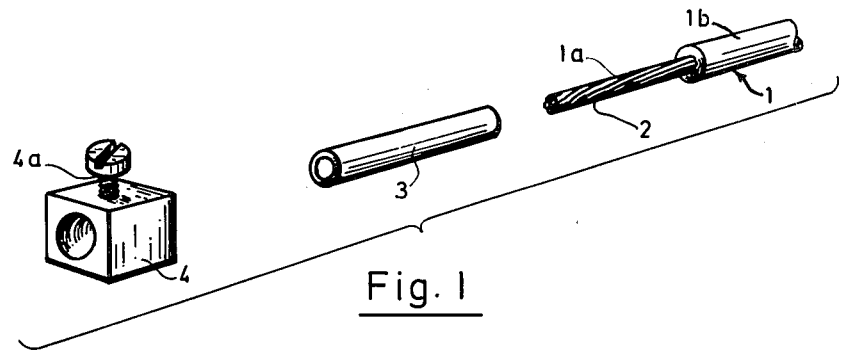
FIG. 1 is a perspective view showing a multi-strand cable with an end from which the insulation has been stripped, a terminal ferrule and a connection terminal.

In accordance with FIG. 1 a cable 1 consisting of a plurality of individual strands 2, which are surrounded by a common insulating sheath 1b, is to be fixed in a connection terminal 4 by means of a screw 4a in an electrically conductive manner. For this purpose the end of the conductor 1a has to have the sheath 1b removed, but must first be introduced into a terminal ferrule 3 which has to be mechanically secured to the cable end 1a by crimping. The screw 4a then acts on the outer perimeter of the crimped-on ferrule 3, and not directly on the individual strands 2.

Figure 2:
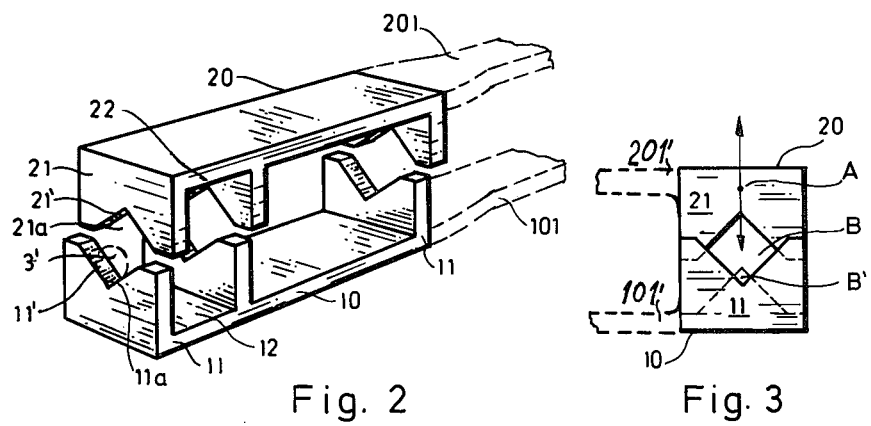
FIGS. 2 and 3 are a perspective view and a front view, respectively, of a pair of jaws forming part of a tool for holding a workpiece such as the cable of FIG. 1.
Figure 3:
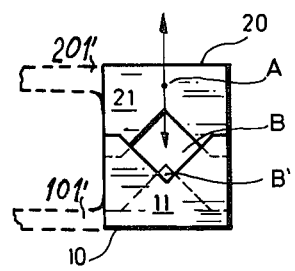
Figure 5:
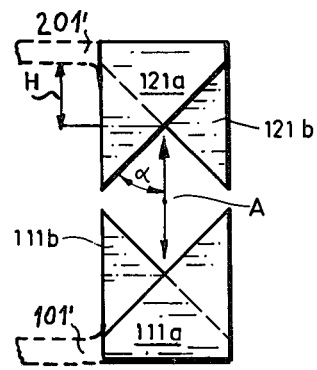

FIGS. 2 and 3 show two jaws 10 and 20, movable with respect to each other substantially in the direction of a double-headed arrow A (FIG. 3), to be used for crimping on the terminal ferrule 3. Each of these jaws 10, 20 is connected, in known manner, with a respective limb 101, 201 shown diagrammatically by dotted lines. These limbs serve to operate the jaws in the manner of a pair of pliers or of a vise-like appliance so that their relative movement is either straight or arcuate. In FIGS. 3 and 5 I have indicated an alternative arrangement wherein limbs 101', 201' extend transversely to the rectangular jaw bases rather than longidutinally thereof as in FIG. 2.

Each of the two jaws comprises a multiplicity of mutually parallel webs 11 and 21, rising transversely from the associated bases, which are separated by respective gaps 12 and 22 and which are provided with V-shaped cutouts 11a and 21a, respectively. The flat edges 11', 21' of the cutouts 11a, 21a, which extend over the width of the webs 11, 21, form inclined engagement faces for gripping a workpiece, the gaps 12, 22 having a width at least equal to the thickness of the plates 11, 21. In the embodiment illustrated in FIG. 2 the gaps are somewhat wider than that; such a spacing is needed particularly where the two jaws 10, 20 are swingable in tong-like manner about a pivot point. Where the movement is vise-like, i.e. parallel, the width of gaps 12, 22 may, with slight additional clearance, correspond to the thickness of the webs 11, 21. For the sake of clarity, a number of webs have been omitted between the second and the last web. Faces 11' and 21' include angles α of 45° with a longitudinal plane of symmetry of the jaw bases coinciding in FIG. 3 with arrow A.

In FIG. 2 the jaws 10, 20 are shown in their opened position. The row of the lower webs 11 forms, together with its cutouts 11a, a V-shaped bed for a round article such as the terminal ferrule 3 (FIG. 1) which, with the inserted cable end 1a, is placed thereon in the manner shown symbolically by the dotted circle 3'. It can be seen from FIG. 2 that the two jaws 10, 20 may be completely identical and that they are merely arranged in relatively displaced positions on their respective limbs 101, 201. Understandably this presents a big advantage from the point of view of production, dispensing with the need to manufacture four different punches and four different complementary dies as is the case in certain conventional tools of this general type.

In FIG. 3 the two jaws 10, 20 are shown in a partly closed position in which a fairly wide throughgoing channel B of quadrilateral cross-section is created for a round workpiece such as ferrule 3 which may thus be of rather large diameter. As the jaws 10, 20 continue to move toward each other, and after contact has been established between the engagement faces 21' of the upper jaw 20 and the ferrule placed on the engagement faces 11' of the lower jaw 10, crimping of the ferrule 3 takes place; depending on the width of the gaps 12, 22, the terminal ferrule may also be subjected to lesser deformations in alternate directions whereby the mechanical strength of the connection between the ferrule 3 and the cable end 1a received therein is increased.

In the case of a workpiece of smaller diameter, on the other hand, contact is made only when the jaws 10, 20 have approached each other to such an extent that a reduced channel B' is produced as indicated by chain-dotted lines.

Figure 4:
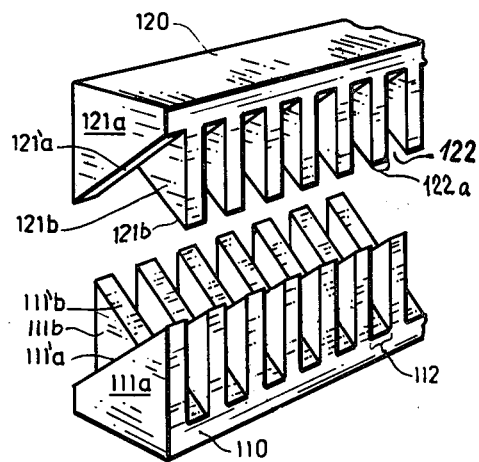
FIGS. 4 and 5 are views similar to FIGS. 2 and 3, showing a modified pair of jaws.

In the embodiment of FIGS. 4 and 5, each of the two jaws 110, 120 has two groups of mutually parallel engagement faces 111'a, 111'b and 121'a, 121'b, respectively. The engagement faces 111'a on the jaw 110 are parallel to the confronting faces 121'a on jaw 120; the same applies to the remaining two groups of faces 111'b and 121'b. In this case, too, the jaws 110 and 120 may be identical.

The gaps 112, 122 between two adjacent webs, e.g. gaps 112 separating adjacent webs 111a with faces 111'a, obviously have to have a width at least equal to the web thickness 122a in order to provide room for the webs of the other jaw to be interleaved therewith, in this instance the webs 121b having faces 121'b; these gaps also accommodate a portion — such as the one indicated in FIG. 5 by a dotted outline — of the webs 111b alternating with webs 111a on the same jaw 110. Naturally, the same also applies to the webs 121a, 121b on the jaw 120. In principle, however, it is also possible to arrange the two sets of webs on one jaw in such a way as to eliminate the distance H (FIG. 5) separating the intersections of all the engagement faces from the associated base.

The width of the space 112, 122 between two adjacent webs of a given set depends on the same considerations as in the previous embodiment, i.e. basically on whether the two jaws perform a tong-like pivotal movement or a vise-like parallel movement.

For obvious reasons the embodiment according to FIGS. 4 and 5 is more advantageous from the production point of view than that according to FIGS. 2 and 3. In both cases, however, the individual jaws 10 and 20 or 110 and 120 need not be made in one piece but may be assembled from two or several component parts and, for example, soldered or welded together or joined by means of an adhesive. It is also worth noting, regarding the jaws 10 and 20, that it is not critical whether the vertex of the cutouts 11a, 21a is actually sharp or whether it has a certain radius of curvature, since the contact with the engaged workpiece takes place at a location remote from this point. It will also be appreciated that the engagement faces 11', 21', 111', 121' need by no means be flat but may have any desired shape.

The plane in which the limbs 101', 210' of FIGS. 3 and 5 move between a withdrawn position and a working position, as indicated by the double-headed arrow A, is perpendicular to the plane of symmetry of the jaw bases (cf. FIG. 10).

The aforedescribed assembly may be incorporated in small plier-type hand tools as well as in larger, stationary devices operated electrically or by compressed air etc.

I shall now describe the adaptation of these tools, in accordance with my present invention, to the stripping of insulation from electric cables with the aid of blade means forming at least one cutting edge between adjacent webs of a jaw.

According to FIG. 6, a coaxial cable 30 consists of an inner conductor 1a, an inner insulating layer 1b surrounding the latter, an outer conductor 1c surrounding the layer 1b and finally an outer insulating sheath 1d. For the purpose of connection to an appliance or the like, the insulation has to be stripped off the cable end in such a way that the outer insulating sheath 1d is peeled off over a length N whereas the inner insulating layer 1b is removed only over a shorter distance M and the outer conductor 1c should either extend to the end of the inner insulating layer 1b or, as shown in the drawing, be peeled off over a length M - L.

The tool shown in FIG. 7 differs from that of FIG. 2 by the presence of three blades 31, 32, 33 projecting beyond respective webs 11 to form straight cutting edges extending parallel to their engagement faces 11'. Blade 32, which in contrast to blades 31 and 33 adjoins the associated web at its front side, protrudes farther beyond the adjacent engagement face than blade 31. It will be appreciated that the cutting edges, which merely cut in their central zone, may also be concave (cf. FIG. 11) and need not be parallel to the associated engagement faces.

The distance $m$ between the two cutting blades 31, 32 corresponds to the distance M on the cable which, however, has to be thought of as reversed with reference to FIG. 6, i.e. with its free end disposed to the right of the second cutting blade 32. The third cutting blade 33 lies at a distance $l$, which corresponds to the distance L on the cable, from blade 31 in order to sever the outer conductor 1c.

In FIG. 8 I have shown the jaw assembly of FIGS. 4 and 5 provided with three cutting blades 131, 133 and 132 disposed one behind the other adjacent respective webs 121b (see FIG. 5) of jaw 120. As indicated at 133' in dotted lines, one or more of these blades may also be arranged on the other jaw 110.

In this case each cutting blade has a concave cutting edge which spans opposite ridges of the two engagement faces of the webs bracketing the blade and which is curved away from the workpiece axis. In FIG. 9 the front view of the jaw 120 is shown, on an enlarged scale, with a cable 30' inserted therein shown dotted, in the working position or final phase of approach of the jaws. The cutting edge of the second blade 132 is arcuately recessed at 132a.

This view clearly indicates the shape and dimensional staggering of the three cutting blades and the extent of their penetration into the cable. The engagement faces of the lower jaw 110, not shown in FIG. 9, duplicate the engagement faces of the upper jaw 120 and bear upon the cable 30'. Since the cable is gripped from four sides, further closure of the jaws 110, 120 and thus any further penetration of the cutting means 131, 132, 133 into the cable 30' is prevented; the arcuate central recess 132a of blade 132 embraces the inner conductor. In the absence of this central recess 132a, the concave cutting edge of the second blade 132 would, in a manner analogous to that shown for the other cutting edges, contact the inner conductor tangentially. These ridge-spanning cutting edges could also be linear, i.e. in the form of straight tangents touching the highest points of the circles which represent the cross-sections of the several cable components.

The various layers of the cable 30' are severed approximately in the cross-hatched zone D and on either side thereof by the cutting means concerned. By rotating the tool in either direction about the cable, as indicated by a double-headed arrow C, the cuts thus formed are extended over the entire periphery, whereupon the tool and, with it, also the severed portions of layers 1b, 1c, 1d are pulled off the cable in the axial direction, i.e. perpendicularly to the plane of the drawing.

FIG. 10 shows a tong-shaped hand tool whose two limbs 101', 201', pivotally connected together at 200, carry jaws 110, 120 in accordance with FIGS. 4 and 8 at their free ends. A spring 103 biases the limbs 101', 201', and thus also the jaws 110, 120, into their closed or working position.

The application of pressure to points 101'a, 201'a of the two crossing limbs causes the tool to open. The upper limb 201' is preferably formed directly as an extension of the leaf spring 103. The drawing shows the tool in a partly open or withdrawn position in which a cable may be introduced.

After insertion of the cable, the two limbs are released and the spring 103 causes the jaws 110, 120 to approach each other with a predetermined force until the engagement faces firmly embrace the cable. At that stage the incisions in the zone D in accordance with FIG. 9 have already been produced by the several cutters of which only the blade 131 is visible in FIG. 10. Now the entire tool is rotated once or several times around the cable — in accordance with the double-headed arrow C of FIG. 9 — to complete the severance of the portions to be stripped off. The tool is now gripped simultaneously at both ends and withdrawn in the axial direction of the cable, i.e. perpendicularly to the plane of the drawing, together with the severed portions of the cable layers. Upon re-opening by the application of pressure to the points 101'a and 201'a (FIG. 10) the severed portions drop out of the tool.

It will be appreciated that not only different types of cutting elements but also different types of engagement faces can be combined in a single tool in such a way that like elements are always juxtaposed on the two jaws.

For comparison purposes, FIG. 10 also shows on the lower jaw 110 in dotted lines a blade 31' with a linear cutting edge parallel to the adjacent engagement face. This makes it apparent that a ridge-spanning and a parallel cutting edge have to protrude by different distances beyond the adjacent engagement faces in order to achieve the same depth of incision into the cable.

There is also indicated in FIG. 10, in dotted lines, on the upper jaw 120 a dovetailed guide 310 in which the cutting blade 131 can slide up and down. A leaf spring 311, however, continuously urges that blade into the extended position shown, in which it is held by nonillustrated abutment means such as a stirrup 43 (FIGS. 11 – 13). The force of the leaf spring 311 or of an equivalent pressure means is so chosen that the cutting blade severs any conventional insulating layer but does not damage the inner conductor.

The aperture at 200 is preferably made of a size such that it can accommodate a finger of an operator's hand to facilitate rotation of the tool.

It will be appreciated that the tool of FIG. 10 can also have two rigid limbs, preferably urged together by a spring, or that both limbs may be defined by parts of a single spring, as is for example the case with so-called battery clips.

In FIG. 11 I have shown the two jaws 110, 120 of FIG. 8, having engagement faces 111', 121', respectively equipped with a cutting blade 133' and a coacting abutment 43. Blade 133' is movable up and down in a manner analogous to the arrangement of FIG. 10 or 13, for example by means of a dovetailed guide (not shown in FIG. 11). The confronting abutment 43 is also reciprocably guided in a manner not shown in FIG. 11. Upon closure of the jaws 110, 120, the abutment 43 urges the cutting means 133' back into the jaw 110 to an extent depending on its adjustment.

FIGS. 12a, 12b and 13 show the preferred stirrup shape of the abutment 43 and an alternative form of cutting blade 33". Both these elements move in respective dovetailed guides 310, 410 (FIG. 13), the blade 33" being permanently urged outwardly by biasing means in the form of a leaf spring 311a.

The adjustment of the abutment 43 can be seen in FIG. 15. A cam 40, which is secured to and rotates with an adjustment disc 41, acts on the first arm of a two-armed lever 42 whose second arm lies against the abutment 43. Upon rotation of the adjustment disc 41, the lever 42 adjusts the abutment 43. The disc 41 is provided on its circumference with indentations which are adapted to be engaged by indexing means 41a. Thus the adjustment disc simultaneously serves as a backstop for the abutment. At least some of the indentations are provided with non-illustrated indications of the selected depth of incision. It will be appreciated that the cam could also act on the abutment 43 directly or via a single-arm lever.

The insulation-stripping tool shown in FIGS. 14 to 16 has two jaws 110a, 120a provided with the engagement faces 111', 121' which are shown very diagrammatically. The movable cutting blade 33" and the abutment 43 are arranged within the row of webs in the manner described above. Each jaw 110a, 120a is provided with a bent supporting lever 131, 231. The levers 131, 231 are arranged side by side or slotted in such a way that they can intersect freely. The abutment 43 and the cutting blade 33" are, for the sake of clarity, shown disproportionately thick; they are in fact thinner than the webs. The lever 231 is rigid and the lever 131 is pivotally connected to the front portion 102a of a handle or holder 102 by means of a hinge 131b.

The two jaws 110a, 120a are urged together by means of a tension spring 103a. When the tool is gripped at the holder 102 and the rear portions 131a, 231a of the two supporting levers 131, 231 are pressed together between two fingers, the jaws 110a, 210a open against the force of the tension spring 103a, and a cable may be introduced into the throughgoing channel formed by the engagement faces 111' and 121'. First, however, the abutment 43 has to be adjusted, by means of the disc 41, in such a way that, when the pressure is removed from the lever arms 131a, 231a and the tension spring 103a brings the jaws together, the abutment 43 urges the blade 33" back to the extent necessary for avoiding with certainty any damage to the conductors proper of a given cable by the cutting edge of the blade or blades at critical points, namely (in the case of blade 33") at the two locations D' shown cross-hatched in FIG. 13. In the case of a blade 33' in accordance with FIG. 11, a single point of incision, at the lowest point of the cutting edge, would result.

The front portion 102a of handle 102 is rotatably supported on its main portion 102b, e.g. by means of a bolt 105 and preferably through the intermediary of a roller bearing 104. The outer surface of the front portion 102a is knurled, grooved or similarly shaped so that it can readily be turned to and fro between two fingers. Thereby the jaws 110a, 120a are also caused to rotate about the longitudinal tool axis, which coincides with the longitudinal axis of the jaw channel, with the consequence that the local incisions are extended over the entire circumference of the cable which is firmly held in the other hand. Since the engagement faces are smooth and of such width as not to bite into the surface of the insulation, they present no significant resistance to any rotary movement even when the jaws are closed. Withdrawal of the cable in the axial direction also presents no difficulty with the jaws closed, upon completion of the insulation-stripping operation, whereby the severed portions of the cut cable components are simultaneously peeled off.

It will be appreciated that, instead of being articulated to the handle 102 by a hinge, one or both of the supporting levers may be constituted by a leaf spring.

Figure 17:
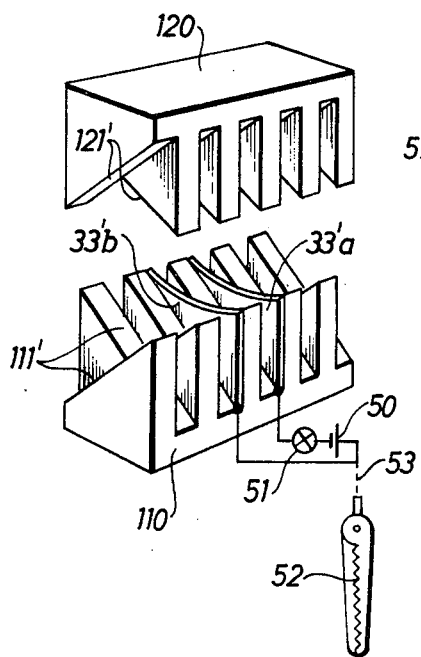
FIG. 17 is a perspective view showing the two insulation-stripping jaws of FIG. 11 modified to include an electric signaling circuit.

In FIG. 17 I have shown an assembly similar to that of FIG. 11 whose lower jaw 110 has a first cutting blade 33'a which is fixed, or movable against the pressure of a spring as shown in FIG. 13, and, slightly spaced therefrom, a second cutting blade 33'b. The two blades 33'a, 33'b are, as shown in a very diagrammatic manner, connected across a power source 50 in series with a lamp 51 in a test circuit which is normally open between these blades. It will, however, be evident that the circuit is immediately closed as soon as the two cutting edges — as shown diagrammatically in FIG. 20 — contact the conductor 1a upon penetration of the insulating sheath 1b of a cable 1 in the course of the insulation-stripping operation. Upon the closing of the circuit, the lamp 51 is lit and thus indicates that any further mutual approach of the jaws 110, 120 is undesirable. The jaws are then — in the embodiment shown in FIGS. 18 and 19 — rotated around the cable whereby the local incision is spread over the entire circumference of the sheath as shown dotted in FIG. 20 at U and V. The severed end of the insulation can then readily be peeled off the conductor 1a, its division into two parts Y and Z being of no significance since these fragments go to waste in any event. The desired length over which the insulation is stripped is of course equal to Y+Z, i.e. the cable is introduced into the insulation-stripping tool in such a manner (e.g. by suitable adjustment of an abutment as described above) as if the second cutting blade 33'b did not exist at all.

Figure 20:
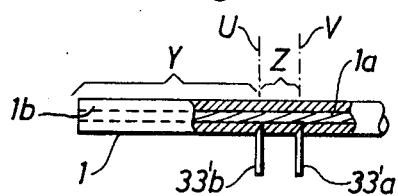
FIG. 20 diagrammatically shows the first phase of an insulation-stripping operation performed with the tool of FIGS. 17 - 19.

With two blades 33'a and 33'b spaced apart in the longitudinal direction of the inserted cable 1 and connected to opposite terminals of voltage source 50, as shown in FIGS. 17 and 20, the blade 33'b closer to the cable end may project slightly farther than the other blade 33'a toward the cable axis. If blade 33'b extends so far beyond the adjoining web faces as to cut through the conductor of cable core 1a before the blade 33'a makes conductive contact therewith, the distance between the cable end and the blade 33'b should be small (e.g. a few millimeters) to minimize the loss of metal. On the other hand, the difference in penetration may amount to only, say, a tenth of a millimeter in which case just a few strands of the cable core will be sacrificed before the cutting operation is halted.

The second blade could also be mounted on the jaw 120, opposite the first blade 33'a and symmetrically with respect thereto. If Y+Z is the length of the cable end from which the insulation is to be stripped, the blade 33'b in FIG. 20 would then lie along line V above the central axis of the conductive core 1a of the cable.

The possibility of connecting one pole of the power source 50 to the conductor 1a is shown dotted in FIG. 17. The electric current, instead of flowing through the short stretch of conductor 1a corresponding to the section Z in FIG. 20, flows in that case through a longer section between the first (and in this case possibly sole) cutting blade 33'a and a junction (not shown) of a separate conductor 53 between one pole of the power source 50 or the indicating lamp 51 and, for example, a crocodile clip 52 for connection to a point of the conductor 1a which has already been bared.

Figure 18:
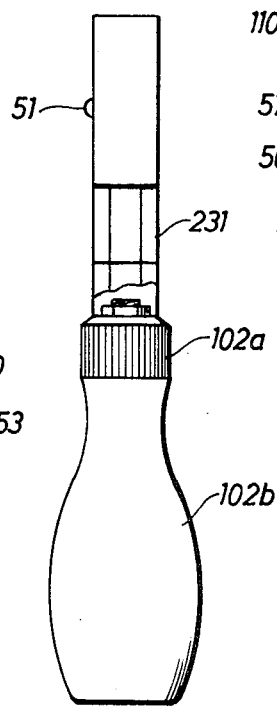
FIGS. 18 and 19 are views similar to FIGS. 14 and 15, showing another signaling circuit.
Figure 19:
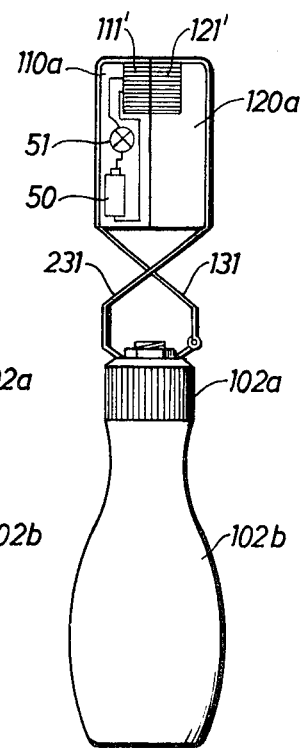

In the insulation-stripping tool shown in FIGS. 18 and 19, in which the cutting blades have been left unillustrated for the sake of simplicity, the lamp 51 and the battery 50 are accommodated in one of the two jaws 110, 120. Here the jaws 110, 120 are shown very diagrammatically in section and details which are irrelevant to the signaling arrangement have been omitted.

It will be appreciated that the battery 50 as well as the signal lamp 51 may equally well be accommodated elsewhere in the tool body, e.g. in the holder 102. In known manner they are made readily accessible, so that they may be exchanged.

In the case of stationary appliances (industrial installations of factory size) the mains supply may be used as the voltage source and instead of a warning signal a control signal may be emitted directly.

A test circuit as shown in FIGS. 17 - 20 is particularly advantageous with certain types of insulation, such as Teflon, which must be cut with great precision to avoid damage to the underlying conductors.

I claim:

1. A tool for stripping insulation from a cable, comprising a first jaw and a second jaw each having an elongate base with a multiplicity of parallel webs transverse to said base and provided with faces inclined at an acute angle to a longitudinal plane of symmetry bisecting said base, operating means linked with said jaws for enabling a displacement thereof between a withdrawn position and a working position, the planes of symmetry of said bases substantially coinciding with each other at least in said working position with said faces of corresponding webs of said jaws confronting each other for gripping an extremity of an insulated cable inserted between said jaws in said withdrawn position, and blade means on at least one of said jaws positioned between adjacent webs thereof and projecting beyond said adjacent webs to form a cutting edge in a plane parallel to said webs biting into the insulation of a cable gripped by said faces.

2. A tool as defined in claim 1 wherein said faces of the webs of each jaw are alternately inclined in opposite directions with reference to said plane of symmetry, each web of said first jaw being aligned with a respective web of said second jaw with resulting interpenetration of said webs in said working position.

3. A tool as defined in claim 2 wherein the inclined faces of the aligned jaws are parallel to each other at least in said working position.

4. A tool as defined in claim 2 wherein said cutting edge is concave and spans opposite ridges of a pair of adjacent web faces.

5. A tool as defined in claim 1 wherein said jaws are provided with biasing means urging them into said working position, said operating means including a pair of intersecting arms squeezable to move said jaws into said withdrawn position against the force of said biasing means.

6. A tool as defined in claim 1, further comprising a test circuit for determining the establishment of contact between said cutting edge and a conductive core of the gripped cable, said test circuit including indicator means and conductor means connecting said indicator means to said blade means in series with a voltage source by way of said blade means and said core.

7. A tool as defined in claim 1 wherein said blade means is movably supported on said first jaw and is provided with spring means urging said cutting edge toward said second jaw, further comprising abutment means on said second jaw for limiting the displacement of said cutting edge by said spring means in said working position.

8. A tool as defined in claim 7 wherein said second jaw is provided with adjustment means for varying the position of said abutment means thereon.

9. A tool as defined in claim 1 wherein said faces are flat.

10. A tool as defined in claim 9 wherein said acute angle is substantially 45°.

11. A tool as defined in claim 1 wherein said blade means comprises a plurality of blades projecting by different distances beyond the adjacent webs.

12. In a tool for stripping insulation from a cable, in combination:
 a first jaw and a second jaw movable toward and away from each other between a withdrawn position and a working position, said jaws having faces for gripping in said working position an extremity of an insulated cable inserted therebetween in said withdrawn position;
 blade means on at least one of said jaws positioned to penetrate an insulating sheath of said cable surrounding a conductive core; and
 a test circuit for determining the establishment of contact between said blade means and said core, said test circuit including indicator means and conductor means connecting said indicator means in series with a voltage source by way of said blade means and said core.

13. The combination defined in claim 12 wherein said blade means comprises a pair of blades connected to opposite terminals of said source.

14. The combination defined in claim 13 wherein said blades are spaced apart in the longitudinal direction of an inserted cable, one of said blades projecting farther than the other toward the cable axis.

* * * * *